United States Patent [19]

Corkin

[11] Patent Number: 4,724,599
[45] Date of Patent: Feb. 16, 1988

[54] MACHINE TOOL FOR SIMULTANEOUSLY FINISHING A PLURALITY OF PARALLEL SURFACES

[75] Inventor: William R. Corkin, Ypsilanti, Mich.

[73] Assignee: General Motors Corporation, Detroit, Mich.

[21] Appl. No.: 942,683

[22] Filed: Dec. 17, 1986

[51] Int. Cl.$^4$ .................. B23F 17/00; B23F 23/00
[52] U.S. Cl. .................................. 29/557; 29/276; 51/52 R; 409/10; 409/31; 409/33
[58] Field of Search ............ 409/10, 18, 20, 24, 409/28, 31, 33, 36, 55, 56, 57, 12, 26, 51, 25; 29/27 R, 27 C, 566, 326, 402.06, 557, 558, 56.5; 51/5 B, 5 C, 52 R, 52 HB, 56 G, 95 GH, 105 GG, 123 G, 287

[56] References Cited

U.S. PATENT DOCUMENTS

| | | | |
|---|---|---|---|
| 2,245,654 | 6/1941 | Drader et al. | 409/31 X |
| 2,598,431 | 5/1952 | Praeg | 409/31 |
| 3,068,759 | 12/1962 | Gates | 409/31 |
| 3,090,168 | 5/1963 | Carlsen | 51/52 R |
| 3,699,724 | 10/1972 | Ellis et al. | 51/287 |
| 3,739,687 | 6/1973 | Bougiouris | 51/52 R X |
| 4,322,917 | 4/1982 | Ueda | 51/123 R |
| 4,575,289 | 3/1986 | Fischer et al. | 409/33 |
| 4,631,870 | 12/1986 | Sun | 51/95 GH X |

FOREIGN PATENT DOCUMENTS 58-28417  2/1983  Japan ........................... 409/10

Primary Examiner—Howard N. Goldberg
Assistant Examiner—Taylor Ross
Attorney, Agent, or Firm—Donald F. Scherer

[57] ABSTRACT

A machine tool for supporting a workpiece during the finishing of a plurality of surfaces has a pair of center support means which are coaxially aligned for rotatably supporting a shaft and gear structure. Bearing support surfaces can be simultaenously machined concentric with the axis of the center supports. A gear finishing tool is supported on another axis which is disposed in nonintersecting relation with the axis of the center supports for simultaenously machining a gear surface.

3 Claims, 3 Drawing Figures

MACHINE TOOL FOR SIMULTANEOUSLY FINISHING A PLURALITY OF PARALLEL SURFACES

BACKGROUND OF THE INVENTION

This invention relates to machine tools and more particularly to such tools that support a workpiece during the performance of a plurality of simultaneous operations.

SUMMARY OF THE INVENTION

It is an object of this invention to provide an improved machine tool which will support a workpiece for the simultaneous machining of two or more coaxial bearing support surfaces and a gear surface having a pitch diameter concentric with the axis of the bearing support surfaces.

It is another object of this invention to provide an improved machine tool which will support a workpiece on a shaft member secured in spaced axially aligned center supports for the simultaneous machining of a pair of spaced coaxial bearing surfaces and a coaxial gear surface disposed between the bearing surfaces and radially displaced therefrom.

These and other objects and advantages of the present invention will be more apparent from the following description and drawings.

DESCRIPTION OF THE PREFERRED EMBODIMENT

Figure 1:
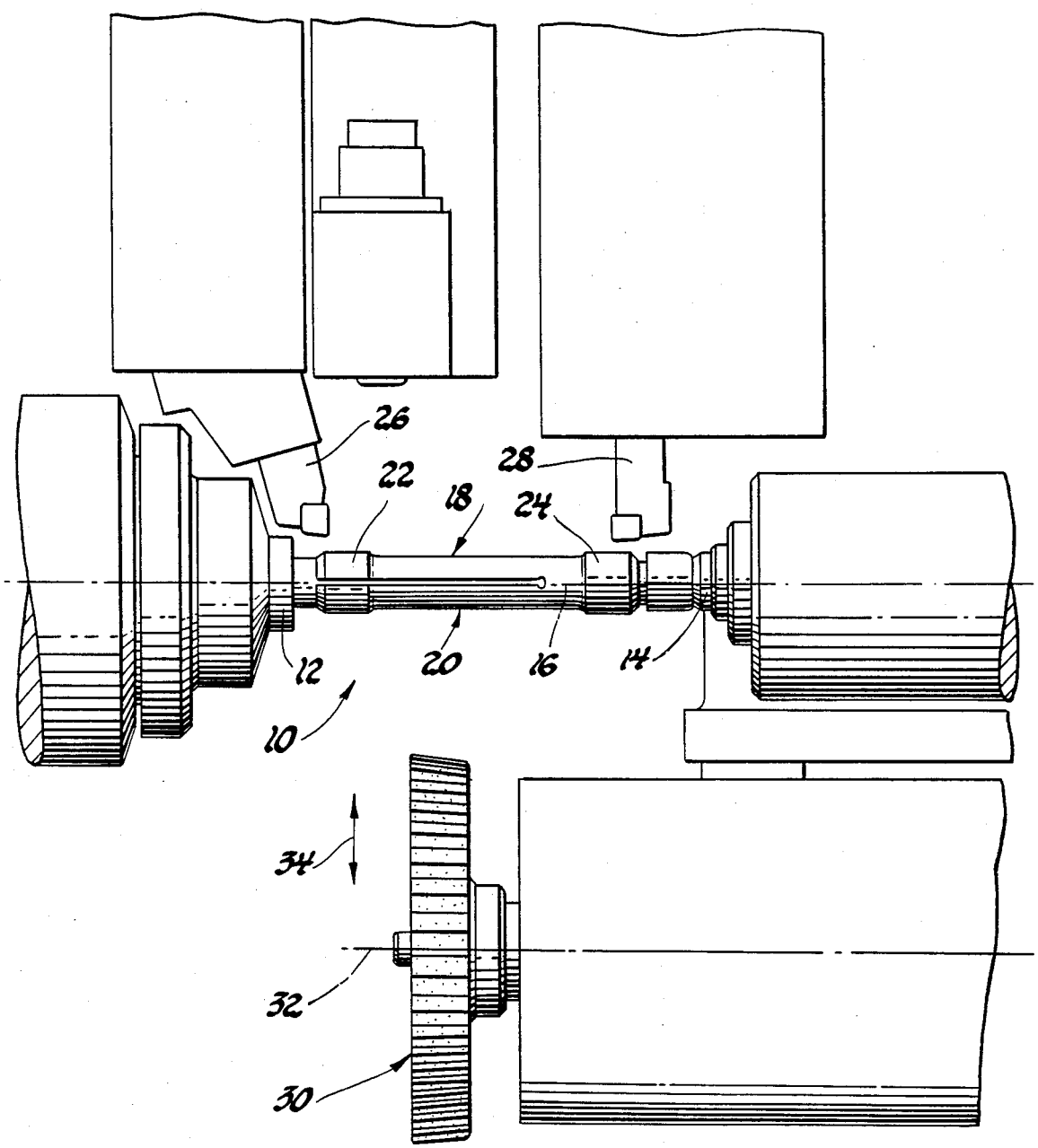
FIG. 1 is a top plan view of a machine tool incorporating the invention.

Referring to the drawings, wherein like characters represent the same or corresponding parts throughout the several views, there is seen in FIG. 1 a machine tool, generally designated 10, having a pair of spaced support members or live centers 12 and 14 which are coaxially aligned on an axis 16.

A conventional workpiece chucking device 18 includes a support shaft 20 having spaced support surfaces 22 and 24. The chucking device 18 is a conventional device and may be constructed as a collet-type mechanism.

A pair of finishing tools 26 and 28 are disposed adjacent the chucking device 18. These tools 26 and 28 are movable toward and away from the chucking device 18 as well as being movable longitudinally of the chucking device 18. The work tools 26 and 28 may take the form of lathe-type machines or grinding-type machines or any of the conventional bearing surface finishing machine tools.

A gear finishing tool or machine 30 is disposed adjacent the supports 12 and 14 and is adapted to provide forming and/or finish machining of a gear tooth. The machine 30 is movable longitudinally relative to axis 16 along an axis 32 and is likewise movable toward and away from the axis 16 in the direction of Arrow 34. Thus, it is apparent that the machine tool 30 can be positioned relative to axis 16 to accommodate the machining of various size and types of gear teeth. The axis 32 can be disposed in an oblique relation with axis 16 to accommodate the machining of hypoid or bevel gear teeth. The important consideration for this tool is the maintenance of proper alignment of the axes 16 and 32 and the positioning of the tools 26, 28 and 30. This ensures that the proper and correct dimensional relationships will be maintained between the bearing surfaces and the gear teeth. In the past, these relationships have been maintained by selective assembly of finished gears and finished shafts or housings. Without the present invention, it is necessary to maintain very close machining tolerances at the gear mounting surfaces on the gear and shaft or housing.

Figure 2:
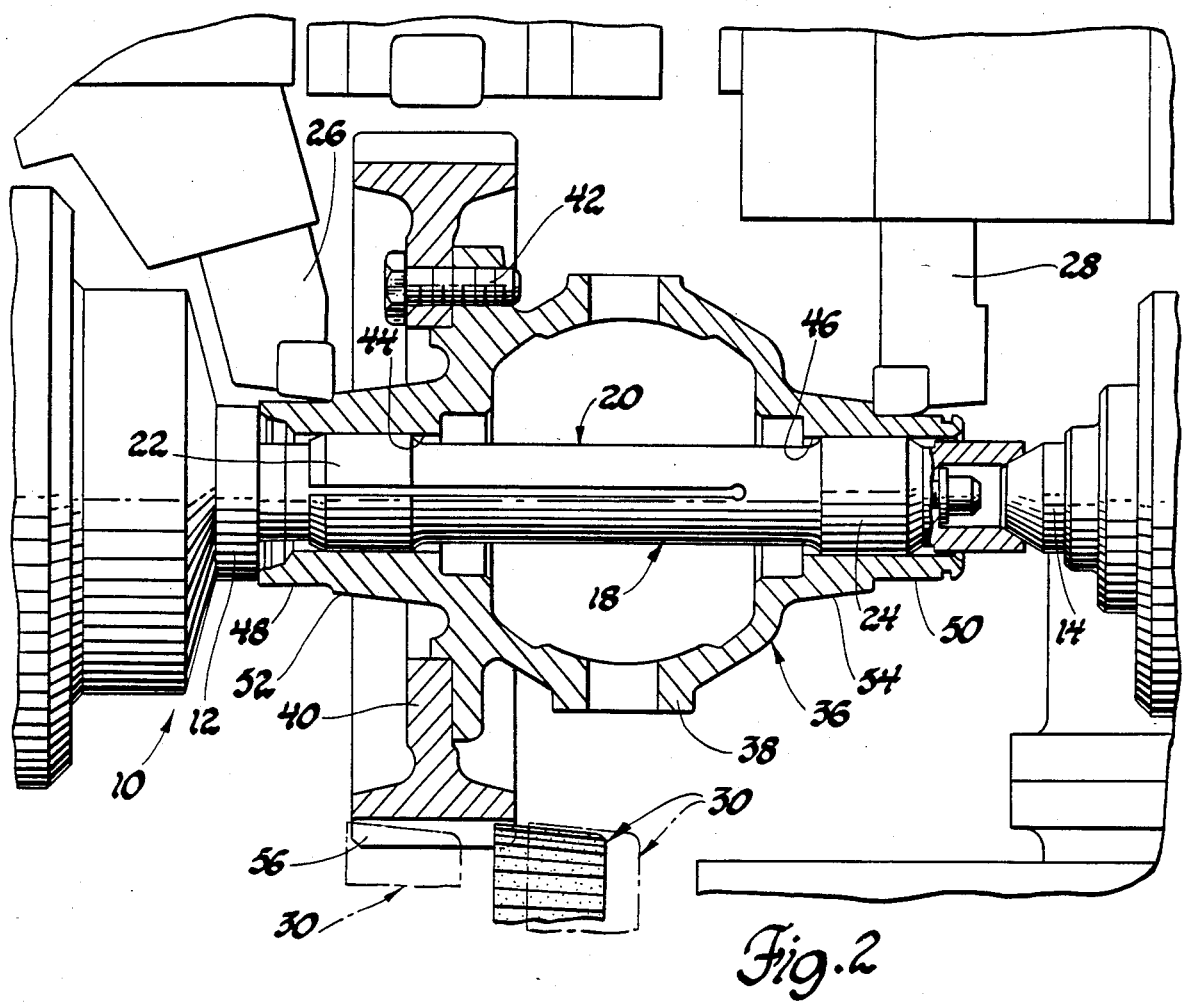
FIG. 2 is a view similar to FIG. 1 showing a differential gear and housing mounted on the tool.

In FIG. 2, there is seen the machine tool arrangement of FIG. 1 with a differential gear assembly 36 secured on the chucking device 18. The differential assembly 36 is comprised of a housing 38 and a ring gear or input gear 40. The input gear 40 is secured to the housing 38 by a plurality of fasteners, such as 42. In the alternative, the ring gear may be fastened by using any of the conventional securing methods including a press fit.

The housing 38 has a pair of central openings 44 and 46 which are located by the chucking device 18. With the assembly 36 thus located on the tool 10, bearing surfaces 48 and 50 can be machined on the outer surface of hubs 52 and 54, respectively. These bearing surfaces 48 and 50 are formed through the manipulation of machine tools 26 and 28. The manipulation of these tools and controls therefore are well-known.

The gear 40 has a plurality of teeth 56 formed on the outer diameter thereof. These teeth 56 may be rough formed by a machining process prior to being secured to the housing 38. In the alternative, the teeth 56 may be formed concurrently or simultaneously with the machining of the bearing surfaces 48 and 50. In any event, the gear teeth 56 will be finish machined while the assembly 36 is secured on the chucking device 18 to ensure that the pitch diameter of the gear 40 is concentric with the bearing surfaces 48 and 50. The tool finishing or forming the gear teeth 56 may be of any conventional designs such as a hob or grinder, also, it is possible to use the hard finishing method with this tool arrangement.

Figure 3:
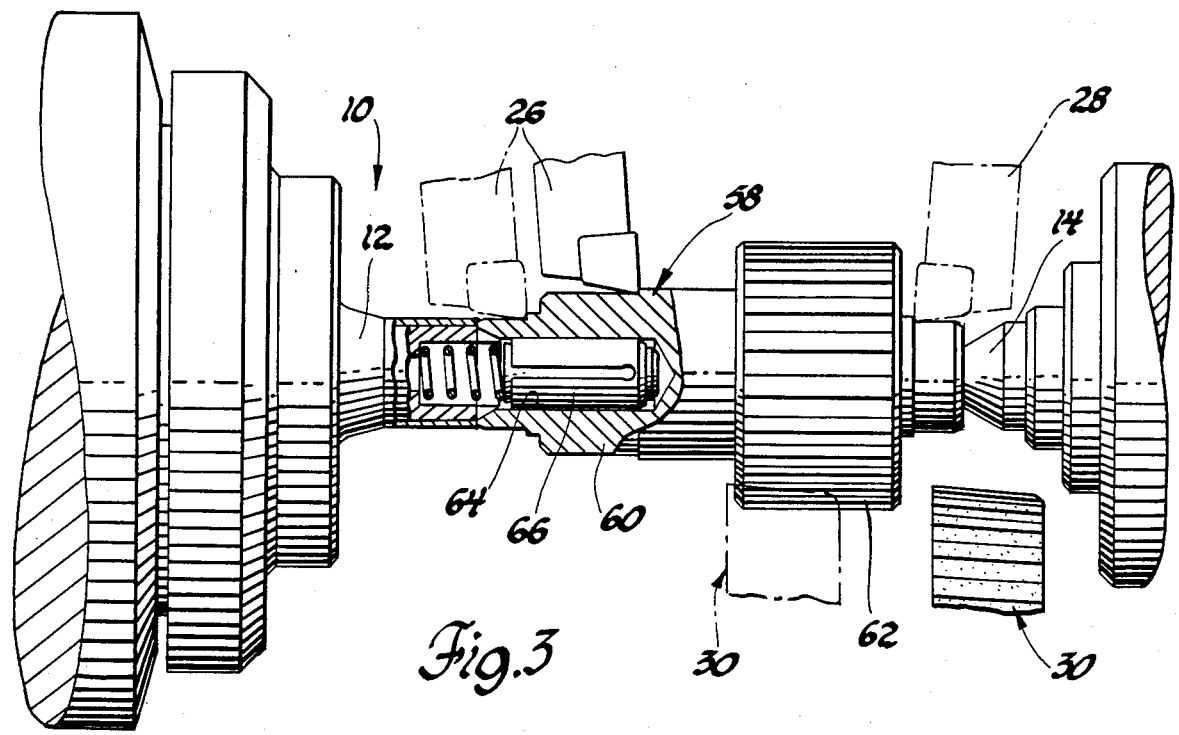
FIG. 3 is a view similar to FIG. 2 showing an integral gear and shaft assembly mounted on the tool.

In FIG. 3, there is seen an integral shaft and gear assembly 58 similar to the type of gearing used in countershaft transmissions or as sun gears in planetary arrangements. This assembly 58 is disposed between the support members 12 and 14; and includes a shaft portion 60 and a gear portion 62. The shaft portion 60 has central openings, such as that shown at 64, formed therein so that conventional chucking devices, such as 66, may be utilized to align the shaft and gear assembly 58 between the support members 12 and 14.

With the shaft and gear assembly 58 thus supported, the machine tools 26 and 28 can perform the bearing surface finishing and the tool 30 can perform the gear tooth finishing. The bearing surface finishing machine 26 or 28 can be utilized to establish more than one bearing surface at distinct diameters. For example, it may be desirable to provide a bearing surface to rotatably support one or more gear members on the shaft portion 60 when the shaft and gear assembly 58 is assembled into a transmission. It may also be desirable to provide both a bearing surface and an adjacent piloting surface at one end of the shaft.

These operations can be performed while the assembly 58 is located between the supports 12 and 14 to ensure concentricity. Likewise, the gear teeth of gear 62 can be formed and/or finished during the time that the shaft and gear assembly 58 is supported between the support members 12 and 14 to ensure concentricity between the bearing surfaces and the finished form of the gear teeth.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A machine tool for finish machining a shaft and gear structure comprising: a pair of coaxially aligned center support means for rotatably supporting a shaft and gear structure; tool means for simultaneously machining a pair of bearing support surfaces on said shaft and gear structure adjacent each of the center support means; and gear tooth finishing tool means disposed on an axis displaced from and in nonintersecting relation with the axis of said center support means for finish machining the gear teeth of said shaft and gear structure substantially simultaneously with the machining of said bearing support surfaces to maintain concentricity between the gear tooth pitch diameter and the bearing surfaces.

2. A machine tool for finish machining a shaft and gear structure comprising: a pair of coaxially aligned center support means for rotatably supporting a shaft and gear structure; tool means for simultaneously machining a pair of bearing support surfaces on said shaft and gear structure adjacent each of the center support means; and gear tooth finishing tool means disposed on an axis in oblique relation with the axis of said center support means for finish machining the gear teeth of said shaft and gear structure substantially simultaneously with the machining of said bearing support surfaces to maintain proper dimensional relationship between the gear teeth and the bearing surfaces.

3. A machine tool for finish machining a gear structure including spaced bearing surfaces and a toothed gear portion comprising: a pair of coaxially aligned center support means for rotatably supporting a gear structure; tool means for simultaneously machining a pair of spaced bearing surfaces on said gear structure between the center support means; and gear tooth finishing tool means disposed on an axis displaced from and oblique to the axis of said center support means for finish machining the gear teeth of said gear structure substantially simultaneously with the machining of said bearing surfaces to maintain the desired dimensional tolerance between the gear teeth and the bearing surfaces.

* * * * *